(12) United States Patent
Tadano et al.

(10) Patent No.: US 9,279,507 B2
(45) Date of Patent: Mar. 8, 2016

(54) THREE-PORT VALVE

(71) Applicant: Tokyo Institute of Technology, Tokyo (JP)

(72) Inventors: Kotaro Tadano, Tokyo (JP); Kenji Kawashima, Tokyo (JP); Mizuki Komiya, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 0 days.

(21) Appl. No.: 14/397,247

(22) PCT Filed: Feb. 19, 2013

(86) PCT No.: PCT/JP2013/053929
§ 371 (c)(1),
(2) Date: Oct. 27, 2014

(87) PCT Pub. No.: WO2013/161357
PCT Pub. Date: Oct. 31, 2013

(65) Prior Publication Data
US 2015/0114496 A1    Apr. 30, 2015

(30) Foreign Application Priority Data

Apr. 27, 2012 (JP) ................................. 2012-104142

(51) Int. Cl.
*F16K 11/20* (2006.01)
*F16K 11/16* (2006.01)
(Continued)

(52) U.S. Cl.
CPC ........... *F16K 11/168* (2013.01); *F15B 13/0401* (2013.01); *F16K 7/04* (2013.01);
(Continued)

(58) Field of Classification Search
CPC .................... F15B 13/0401; F15B 2211/3057; F04B 7/00; F04B 7/0015; F04B 7/0053; F16K 7/06; F16K 11/027; F16K 11/168; F16K 7/04; F16K 11/02; Y10T 137/86919; Y10T 137/87217

USPC .......................................................... 251/6, 9
See application file for complete search history.

(56) References Cited

U.S. PATENT DOCUMENTS 2,313,550 A * 3/1943 Huber ....................... F16K 7/06
137/595
2,985,192 A * 5/1961 Taylor ....................... F04B 7/00
137/627.5
(Continued)

FOREIGN PATENT DOCUMENTS

JP          59-20067 U    2/1984
JP          10-501876 A   2/1998
(Continued)

OTHER PUBLICATIONS

International Search Report for corresponding PCTJP2013/053929 application dated Apr. 9, 2013 (2 pages).
(Continued)

*Primary Examiner* — Jessica Cahill
(74) *Attorney, Agent, or Firm* — Capitol City TechLaw, PLLC; Samuel P. Burkholder

(57) ABSTRACT

A three-port valve that can be more accurately controlled using a simple structure. The three-port valve is provided with the following: a first elastic tube in which a liquid circulates; a first port which is a provision and discharge opening in the first elastic tube; a second elastic tube in which a liquid circulates; a second port which is a provision and discharge opening in the second elastic tube; a third port that links the first port and the second port; first circulation control means for deforming the first elastic tube so as to control the circulation of the liquid circulating in the first elastic tube; second circulation control means for deforming the second elastic tube so as to control the circulation of the liquid circulating in the second elastic tube; and an oscillator for driving the first circulation control means and the second circulation control means.

4 Claims, 9 Drawing Sheets

(51) Int. Cl.
*F16K 7/06* (2006.01)
*F16K 7/04* (2006.01)
*F16K 11/02* (2006.01)
*F15B 13/04* (2006.01)

(52) U.S. Cl.
CPC ................. *F16K 7/06* (2013.01); *F16K 11/02* (2013.01); *F16K 11/027* (2013.01); *F15B 2211/3057* (2013.01); *Y10T 137/87217* (2015.04)

(56) References Cited

U.S. PATENT DOCUMENTS

| | | | | |
|---|---|---|---|---|
| 4,071,039 A * | 1/1978 | Goof | ......................... | F16K 7/04 137/494 |
| 4,269,333 A * | 5/1981 | Nakai | ...................... | B67D 3/00 137/588 |
| 4,484,599 A * | 11/1984 | Hanover | ................. | F16K 7/065 137/595 |
| 4,518,145 A * | 5/1985 | Keltz | ........................ | F16K 7/06 251/5 |
| 4,616,801 A * | 10/1986 | Cewers | ............. | A61M 5/16813 251/6 |
| 5,326,033 A * | 7/1994 | Anfindsen | ............... | F16K 7/065 239/300 |
| 5,542,336 A | 8/1996 | Larkin | | |
| 5,901,745 A * | 5/1999 | Buchtel | ..................... | F16K 7/06 137/595 |
| 8,839,711 B2 * | 9/2014 | Reyhanloo | .......... | A47J 31/4485 137/595 |
| 2007/0068969 A1 * | 3/2007 | Orzech | ................. | B67D 1/108 222/214 |

FOREIGN PATENT DOCUMENTS

| | | |
|---|---|---|
| JP | 2008-208879 A | 9/2008 |
| JP | 2009-019684 A | 1/2009 |
| JP | 2009-068688 A | 4/2009 |

OTHER PUBLICATIONS

Supplementary Search Report for corresponding European patent application No. 13 78 06741 dated Nov. 3, 2015 (6 pages).

* cited by examiner

THREE-PORT VALVE

TECHNICAL FIELD

The present invention relates to three-port valves and relates to three-port valves which are suitable in particular for flow control and pressure control.

BACKGROUND ART

Servo valves which control the feed direction, flow rate, and pressure of a flowing fluid (e.g., gas such as air, liquid, or the like) are used. Such servo valves each have multiple ports including a feed port, an exhaust port, and the like. For example, in the case where pressure control is performed by using a servo valve, the servo valve further has a connection port connected to a controlled object the pressure of which is controlled, as well as the feed port and the exhaust port. Such a servo valve is called a three-port valve. In the case where the flowing fluid is gas, the feed port is an air inlet, and the exhaust port is an air outlet.

A known example of the three-port valve is the servo valve disclosed in Patent Literature 1. The disclosed servo valve has three ports (a feed port, a load port, and an exhaust port). In addition, the disclosed servo valve has a spool and a sleeve. The spool has first and second valve elements. The sleeve contains the spool in such a manner that the spool can move in the axial direction, and the sleeve has a feed port which feeds air to a space between the first and second valve elements. The spool further has a third valve element which are different from the first and second valve elements.

CITATION LIST

Patent Literature

Patent Literature 1: Japanese Patent Laid-open No. 2009-019684

SUMMARY OF INVENTION

Technical Problem

In the servo valve disclosed in Patent Literature 1, the flow characteristic in the lap region (a region in which the built-in valve element(s) are opposed to the sleeve) is nonlinear. Therefore, it is sometimes difficult to control the flow rate of the flowing fluid. Further, since it is difficult to grasp the relationship between the flow rate and the pressure of the flowing fluid, pressure control is sometimes difficult.

Furthermore, the servo valve disclosed in Patent Literature 1 has such a structure that the flowing fluid can leak. Specifically, the fluid can leak through a gap between the inner wall and a valve element of the servo valve. In particular, in the case where liquid is used as the fluid, sealability is especially required. However, since the servo valve disclosed in Patent Literature 1 has the gap through which fluid is likely to leak, the servo valve disclosed in Patent Literature 1 cannot be used as the valve for controlling the flow of the fluid.

As explained above, in some cases, it is difficult to perform accurate control of a variety of types of fluids by the servo valve disclosed in Patent Literature 1. That is, the controllable types of fluids are limited.

Moreover, a great number of parts are needed for constituting the servo valve disclosed in Patent Literature 1. Specifically, the servo valve disclosed in Patent Literature 1 is constituted by the three valve elements (the first, second, and third valve elements) having different dimensions, the spool, the sleeve, and other parts. Therefore, the structure of the servo valve is complicated, and maintenance and the like becomes bothersome in some cases. In addition, since the servo valve disclosed in Patent Literature 1 is constituted by a variety of types of parts, downsizing of the device is difficult.

The present invention has been made in view of the above problems, and the object of the present invention is to provide a three-port valve which is constituted by a small number of constituent parts, has a simple structure, and can be precisely controlled when any of a variety of types of fluids is used. The object of the present invention is achieved by not including the spool and the three valve elements, instead arranging a single flow-path control means (corresponding to the valve elements) in a flow path (tube), and controlling opening and closing of the flow path by use of elastic force of an elastic material.

Solution to Problem

As a result of a diligent study made by the present inventors for solving the aforementioned problems, the present inventors have found that the problems can be solved by the following means. The features of a three-port valve according to the present invention are indicated below.

(1) The three-port valve includes: a first elastic tube through which fluid flows; a first port arranged as a port for feed and exhaust in the first elastic tube; a second elastic tube through which the fluid flows; a second port arranged as a port for feed and exhaust in the second elastic tube; a third port which communicates with the first port and the second port; a first flow control means including a first elastic member and a first movable element through which the first elastic tube is arranged, and controlling flow of the fluid through the first elastic tube by moving the first movable element outward in a direction of elasticity of the first elastic member so as to deform the first elastic tube; a second flow control means including a second elastic member and a second movable element through which the second elastic tube penetrates, and controlling flow of the fluid through the second elastic tube by moving the second movable element outward in a direction of elasticity of the second elastic member so as to deform the second elastic tube; a swinging element which drives the first flow control means and the second flow control means; a first adjustment member which adjusts a flow rate by being moved toward the swinging element in the direction of elasticity of the first elastic member against elastic force of the first elastic member so as to deform the first elastic tube arranged through the first movable element, independently of driving of the swinging element; and a second adjustment member which adjusts a flow rate by being moved toward the swinging element in the direction of elasticity of the second elastic member against elastic force of the second elastic member so as to deform the second elastic tube arranged through the second movable element, independently of the driving of the swinging element. In the three-port valve, a set of the first elastic tube and the first flow control means and a set of the second elastic tube and the second flow control means are symmetrically arranged with respect to the swinging element.

(2) In the above three-port valve, the swinging element is rotatably arranged, and rotates so as to drive the first flow control means and the second flow control means.

(3) In the above three-port valve, the first elastic tube and the second elastic tube are normally closed.

(4) In the above three-port valve, the first port is a feed port, the second port is an exhaust port, and the third port is a port for feed and exhaust which is connected to an object to be controlled.

Effect of Invention

According to the present invention, it is possible to reduce the number of parts constituting a three-port valve, and provide a three-port valve having a simple structure and being capable of performing control with higher precision even when a variety of types of fluids are used. That is, the three-port valve according to the present invention has a simple structure in contrast to the three-port valve disclosed in Patent Literature 1. In addition, the respective means are symmetrically arranged with respect to the swinging element. Therefore, the number of parts and the number of types of parts can be reduced. Further, the simple structure facilitates the maintenance.

Further, the flow of the fluid through each elastic tube is controlled by deforming the elastic tube. Therefore, the flow path through the elastic tube can be completely closed, so that leakage of the fluid flowing through the elastic tube can be prevented with high reliability. Furthermore, since the three-port valve according to the present invention is superior in sealability, the three-port valve according to the present invention can be used for control of the flow of fluids (such as liquids) which particularly require sealability. Therefore, the flow rate, the pressure, and the like can be more precisely controlled even when a variety of types of fluids are used. That is, the flow rate, the pressure, and the like can be controlled without excessive limitation on the usable fluid.

DESCRIPTION OF EMBODIMENT

Hereinbelow, an embodiment of the present invention is explained. However, the present invention is not limited to the examples indicated below, and can be implemented even when the examples indicated below are arbitrarily modified without departing from the scope of the present invention.

In the following explanations, gas (air) is used as an example of a flowing fluid. However, as explained before, the three-port valve according to the present embodiment of the present invention is suitable for fluid flow control, and the flowing fluid is not limited to gas.

<Structure>

Figure 1:
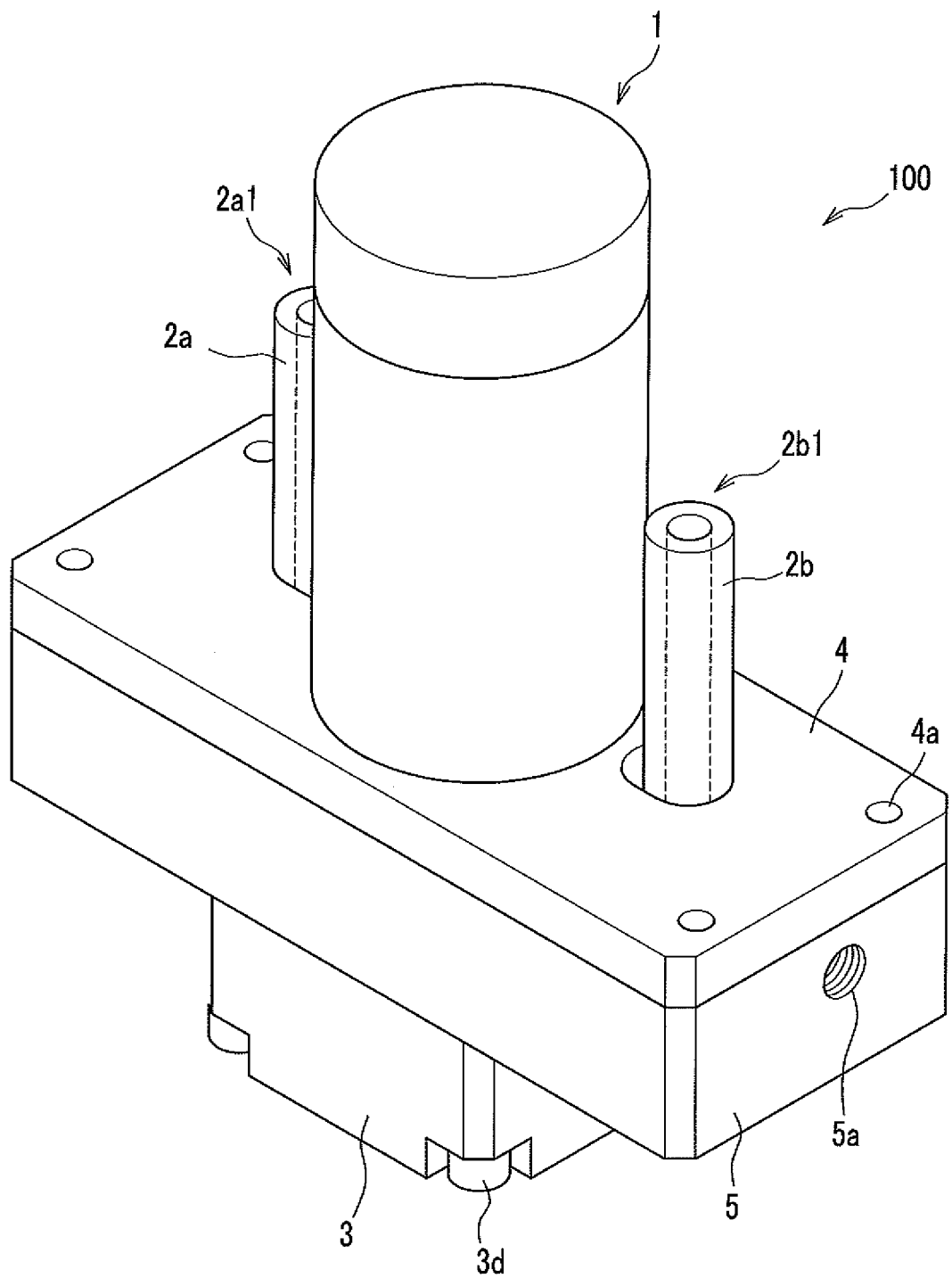
FIG. 1 is a perspective view of an upper part of a three-port valve according to the present embodiment.

FIG. 1 is a perspective view of an upper part of a three-port valve according to the present embodiment. As illustrated in FIG. 1, the three-port valve 100 includes a servomotor 1, tubes 2a and 2b, a manifold 3, a cover member 4, and a casing 5. A hollow is formed in the casing 5, and a control means, which is explained later, is contained in the hollow.

The top of the case 5 is sealed with the cover member 4. The cover member 4 is fixed to the casing 5 with four screws 4a. Stationary-element adjustment holes 5a and 5b are formed on both sides of the casing 5. (The stationary-element adjustment hole 5b is not shown in FIG. 1.) Set screws 10a and 10b are arranged in the stationary-element adjustment holes 5a and 5b so as to be exposed to the outside. (Although the set screws 10a and 10b are not shown in FIG. 1, the set screws 10a and 10b are explained later with reference to FIG. 8.)

The manifold 3 is fixed on the lower surface of the casing 5 with screws 3d.

Gas such as air flows through a tube 2a (the first elastic tube) and a tube 2b (corresponding to the second elastic tube). The tube 2a is arranged such that air or the like is fed to the tube 2a through an air feed port 2a1 (the first port, the port for feed and exhaust, a feed port), and the tube 2b is arranged such that air or the like is exhausted from the tube 2b through an air exhaust port 2b1 (the second port, the port for feed and exhaust, an exhaust port). The tubes 2a and 2b are arranged to extend in the direction parallel to the shaft of the servomotor 1, penetrate through the cover member 4 and the casing 5, and are connected to the manifold 3. This connection will be explained later with reference to FIG. 2.

Figure 3A:
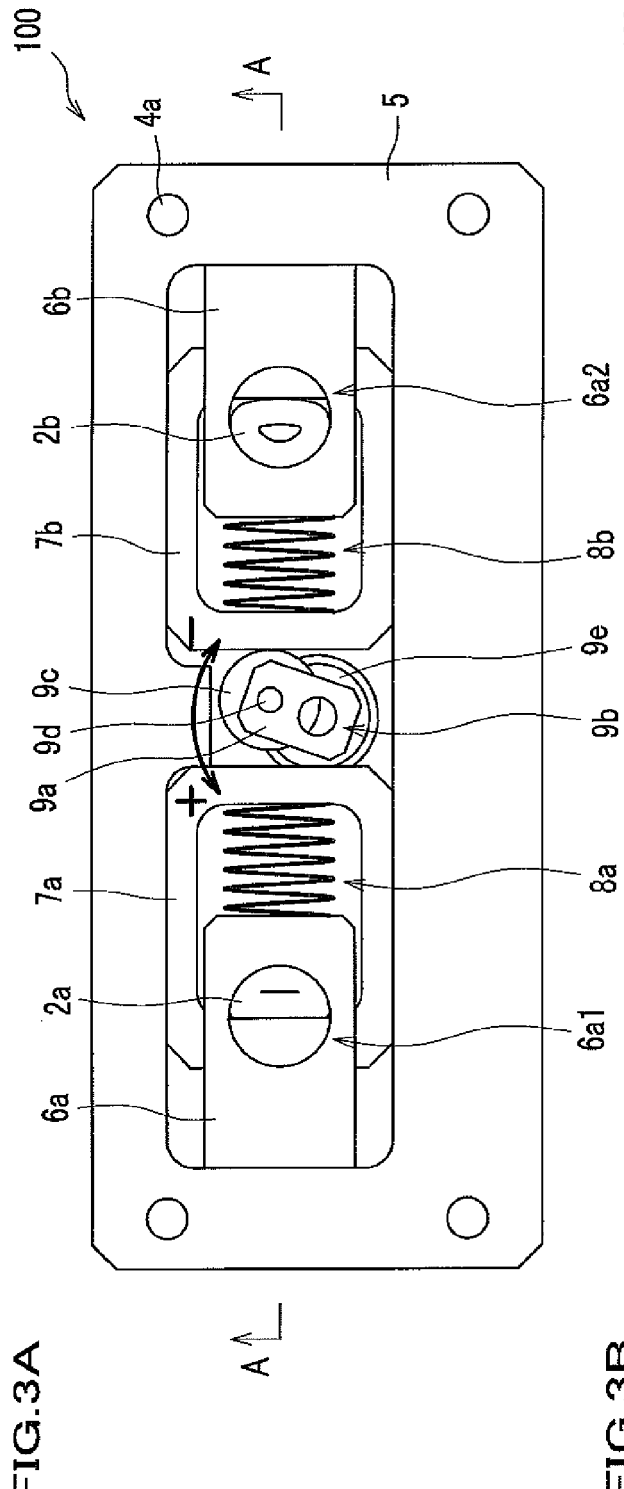
FIG. 3A is an exploded plan view of the three-port valve according to the present embodiment.

The servomotor 1 drives (rotates) a swinging element 9a, which is not shown in FIG. 1 and is shown in FIG. 3. The side and upper portions of the servomotor 1 are covered with the casing 5. The shaft (not shown) of the servomotor 1 connected to the swinging element 9a is arranged to penetrate through the cover member 4. Therefore, the driving force of the servomotor 1 is transmitted to the swinging element 9a, so that the swinging element 9a is driven.

The tubes 2a and 2b are formed of elastic material, for example, resin or rubber.

Figure 2:
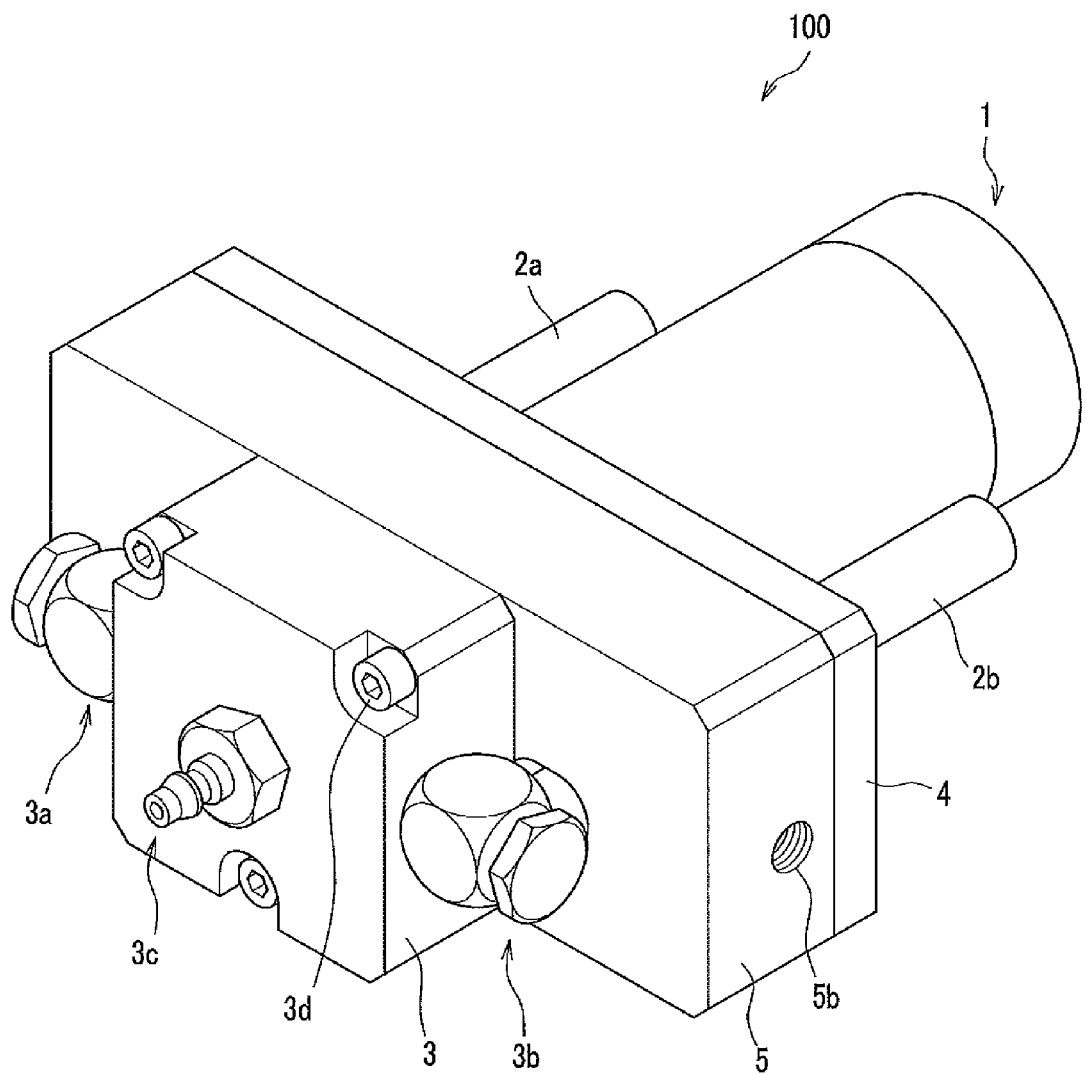
FIG. 2 is a perspective view of a lower part of the three-port valve according to the present embodiment.

FIG. 2 is a perspective view of a lower part of the three-port valve according to the present embodiment. The manifold 3 has tube connection ports 3a and 3b (the port for feed and exhaust) and a sealed-container connection port 3c (the third port, the port for feed and exhaust). The tube connection ports 3a and 3b are arranged to be oriented to an identical direction. On the other hand, the sealed-container connection port 3c is arranged to be oriented to the opposite direction to the tube connection ports 3a and 3b.

As mentioned before, the tubes 2a and 2b penetrate through the cover member 4 and the casing 5, and are connected to the manifold 3. Specifically, the tube 2a is connected to the tube connection port 3a, and the tube 2b is connected to the tube connection port 3b. Although not shown in FIG. 2, the sealed-container connection port 3c is arranged to be connected to a sealed container (the object to be controlled) through another tube.

The sealed-container connection port 3c communicates with the tube connection ports 3a and 3b. Therefore, for example, the air fed from the tube connection port 3a is exhausted from the tube connection port 3b and the sealed-container connection port 3c. The flow of the air fed from the outside will be explained later with reference to FIG. 4.

FIG. 3 includes an exploded plan view and a cross-sectional view of the three-port valve 100. Specifically, FIG. 3 is a diagram illustrating the control means in the casing 5 by removing the servomotor 1 and the cover member 4 from the structure of FIG. 1. In FIG. 3, the stationary-element adjustment holes 5a and 5b and the set screws 10a and 10b are not shown for simple illustration.

The swinging element 9a connected to the servomotor 1 (which is not shown in FIG. 3) is arranged in the casing 5. The swinging element 9a drives movable elements 7a and 7b. The swinging element 9a is fixed to a rotating member 9e, which is rotatably arranged on the bottom surface in the casing 5. In addition, the shaft (not shown) connected to the servomotor 1 is inserted into and fixed to a bore 9b. Thus, the driving force of the servomotor 1 is transmitted to the swinging element 9a.

In the illustrated example, the swinging element 9a is rotated to the minus direction. However, for example, when power supply to the servomotor 1 is stopped, compressing springs 8a and 8b, which are explained later, cause the swinging element 9a to return to the zero position (the middle position between the plus and minus sides).

Stationary elements 6a and 6b, the movable elements 7a and 7b, and the compressing springs 8a and 8b are arranged on both (left and right) sides of the swinging element 9a in positions symmetric with respect to the swinging element 9a. That is, the stationary element 6a, the movable element 7a, and the compressing spring 8a (which constitute the first flow control means) are arranged on one side of the swinging element 9a, and the stationary element 6b, the movable element 7b, and the compressing spring 8b (which constitute the second flow control means) are arranged on the opposite side of the swinging element 9a.

When the swinging element 9a is driven to the plus direction, the stationary element 6a, the movable element 7a, and the compressing spring 8a (which constitute the first flow control means) participate in the control. When the swinging element 9a is driven to the minus direction, the stationary element 6b, the movable element 7b, and the compressing spring 8b (which constitute the second flow control means) participate in the control. That is, the set of the stationary element 6a, the movable element 7a, and the compressing spring 8a is controlled independently from the set of the stationary element 6b, the movable element 7b, and the compressing spring 8b.

One end of each of the stationary elements 6a and 6b is fixed on the inner wall of the casing 5, and the other end of each of the stationary elements 6a and 6b is in contact with the compressing spring 8a. Bores 6a1 and 6b1 corresponding to the sizes (the diameters) of the tubes 2a and 2b are formed in the stationary elements 6a and 6b. In addition, the tubes 2a and 2b are respectively inserted in the bores 6a1 and 6b1.

The stationary elements 6a and 6b are arranged to be able to be moved back and forth in the direction of the swinging element 9a with the set screws 10a and 10b. In other words, the aforementioned first flow control means and the second flow control means are arranged to be moveable back and forth in the direction of the swinging element 9a. Details of the arrangement of the first flow control means and the second flow control means will be explained later with reference to FIG. 8.

Each of the movable elements 7a and 7b is arranged to be able to slide along the inner wall of the casing 5 when a roller 9c is brought into contact with each of the movable elements 7a and 7b by the driving of the swinging element 9a. The compressing springs 8a and 8b are arranged between outer end faces of the stationary elements 6a and 6b and inner end faces of the movable elements 7a and 7b. Therefore, the movable elements 7a and 7b are arranged to be able to slide in the direction of the elasticity of the compressing springs 8a and 8b against the elastic force of the compressing springs 8a and 8b.

Figure 3B:
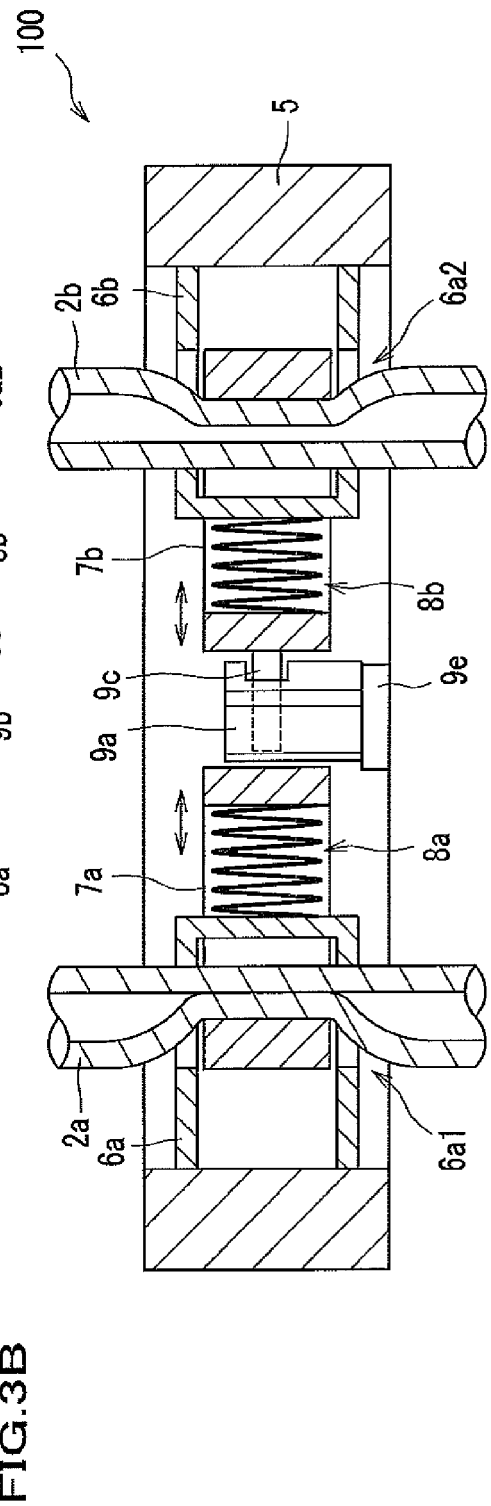
FIG. 3B is a cross-sectional view of the three-port valve according to the present embodiment.

Next, variations in the shape of the tube 2b with movement of the movable element 7b are explained below. FIG. 3B is a cross-sectional view of the three-port valve illustrated in FIG. 3A, at the A-A cross section indicated in FIG. 3A.

As illustrated in FIG. 3B, the stationary element 6a and the movable element 7b are arranged to fit to each other in such a manner that the stationary element 6a and the movable element 7b intersect. At this time, the tube 2b inserted in the bore 6b1 is interposed between the stationary element 6b and the movable element 7b, and the flow path is completely closed. That is, the tube 2b is normally closed. When the swinging element 9a is driven to the minus direction, the swinging element 9a comes into contact with the movable element 7b. When the driven amount of the swinging element 9b to the direction to the movable element 7b further increases, the swinging element 9b causes the movable element 7b to slide toward the outside of the casing 5 against the force of the compressing spring 8b. Then, the tube 2b is automatically restored from the deformation, and the flow path through the tube 2 is opened. That is, the stationary element 6b and the movable element 7b (which constitute the second flow control means) control the gas flow through the tube 2b by deforming the tube 2b (the second elastic tube). In this way, in the three-port valve 100, the open-close control of the tubes 2a and 2b is performed by using the resilience of the tubes 2a and 2b.

The three-port valve 100 also operates in a similar manner when the swinging element 9a is driven to the plus direction and the movable element 7a slides. Therefore, the operations performed when the swinging element 9a is driven to the plus direction are not presented here.

The flow control by deformation of the tubes can be performed with a simple structure, and the flowing gas can be controlled with higher reliability and no leakage. However, in the conventional devices which can control as above, only two ports of a feed port and an exhaust port can be arranged. On the other hand, in the three-port valve 100, the stationary elements 6a and 6b, the movable elements 7a and 7b, and the compressing springs 8a and 8b are arranged symmetrically with respect to the swinging element 9a. In addition, the tubes 2a and 2b, which are controlled by the above parts, are also arranged symmetrically with respect to the swinging element 9a.

That is, the set of the tube 2a (the first elastic tube), the stationary element 6a, the movable element 7a, and the compressing spring 8a (which constitute the first flow control means) and the set of the tube 2b (the second elastic tube), the stationary element 6b, the movable element 7b, and the compressing spring 8b (which constitute the second flow control means) are arranged symmetrically with respect to the swinging element 9a. The above structure realizes the three-port valve utilizing the deformation of the tubes. Thus, it is possible to obtain a three-port valve which can be realized by a simple structure, and control the flowing gas with higher reliability and no leakage.

<Operation>

Figure 4:
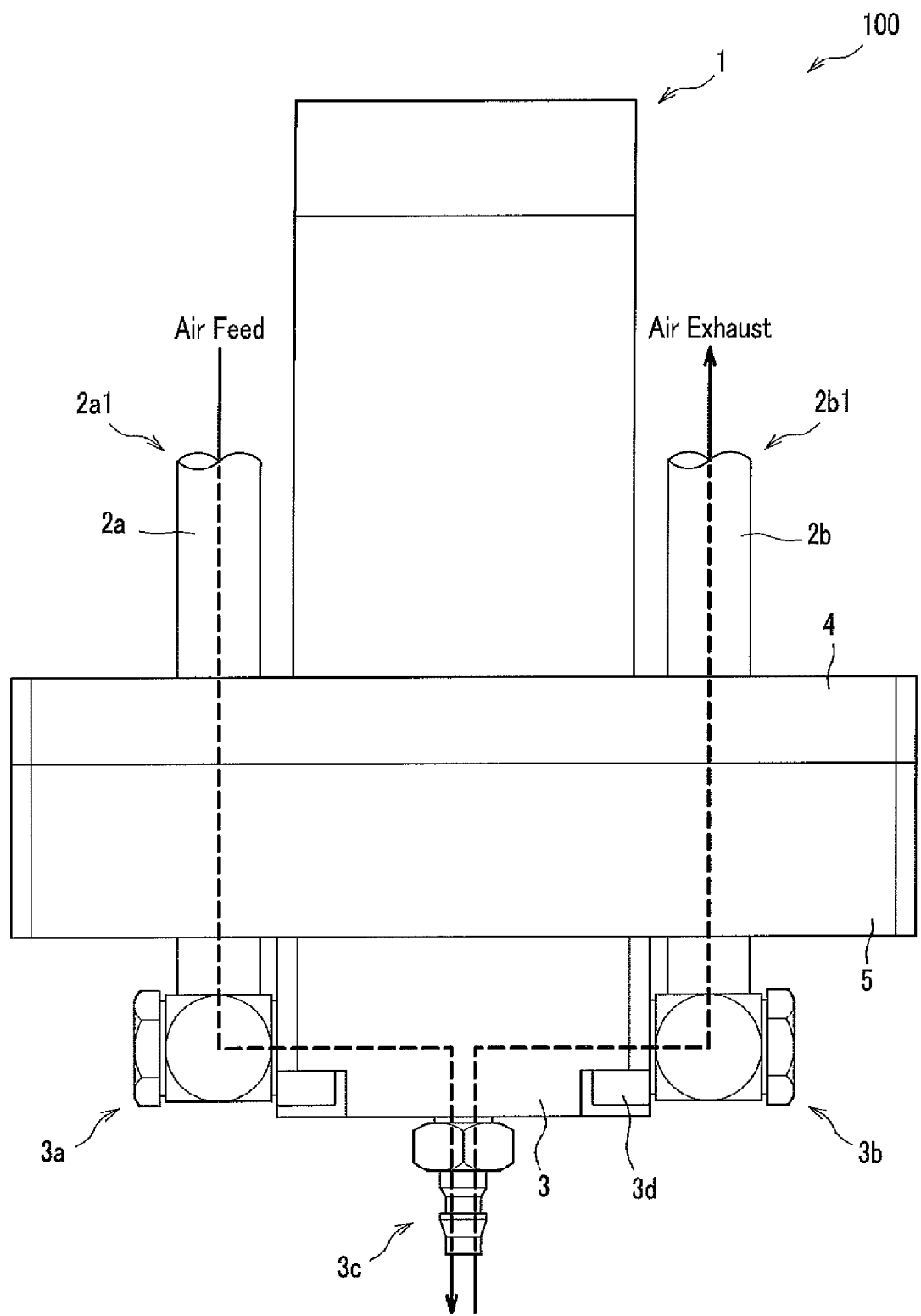
FIG. 4 is a diagram illustrating flow directions of air in the three-port valve according to the present embodiment.

FIG. 4 is a diagram illustrating the flow directions of air in the three-port valve according to the present embodiment. As explained before, the tubes 2a and 2b are normally closed. Therefore, the air taken in through the air feed port 2a1 according to the open-close states of the tubes 2a and 2b is fed to the sealed container (not shown) connected to the sealed-container connection port 3c. Specifically, when the tube 2a is in an open state and the tube 2b is in a closed state, the air is fed to the sealed container.

In addition, the air in the sealed container connected to the sealed-container connection port 3c is exhausted through the air exhaust port 2b1 according to the open-close states of the tubes 2a and 2b. Specifically, when the tube 2b is in an open state and the tube 2a is in a closed state, the air is exhausted from the sealed container.

Figure 5:
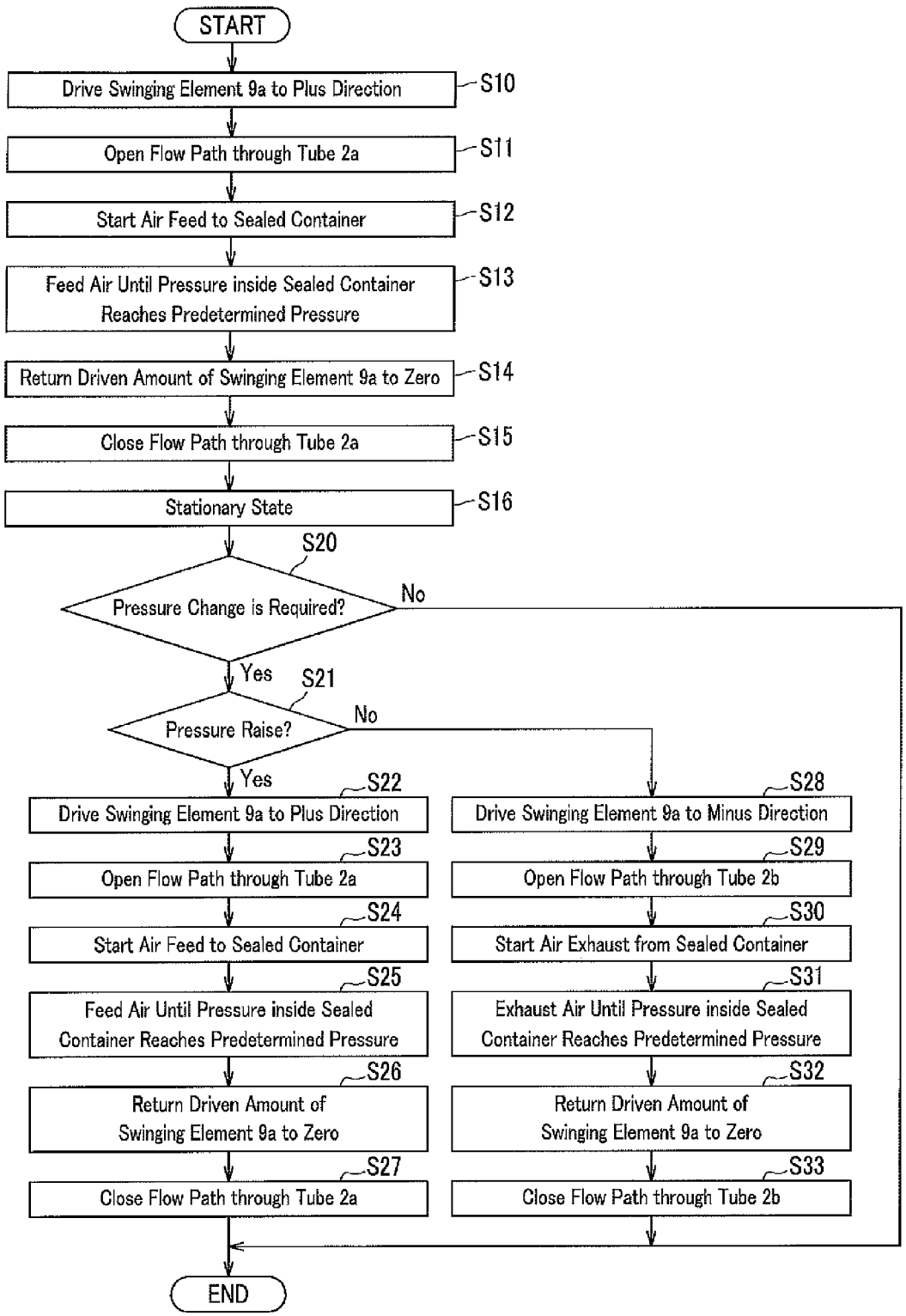
FIG. 5 is a flow diagram of air flow control in the three-port valve according to the present embodiment.
Figure 6:
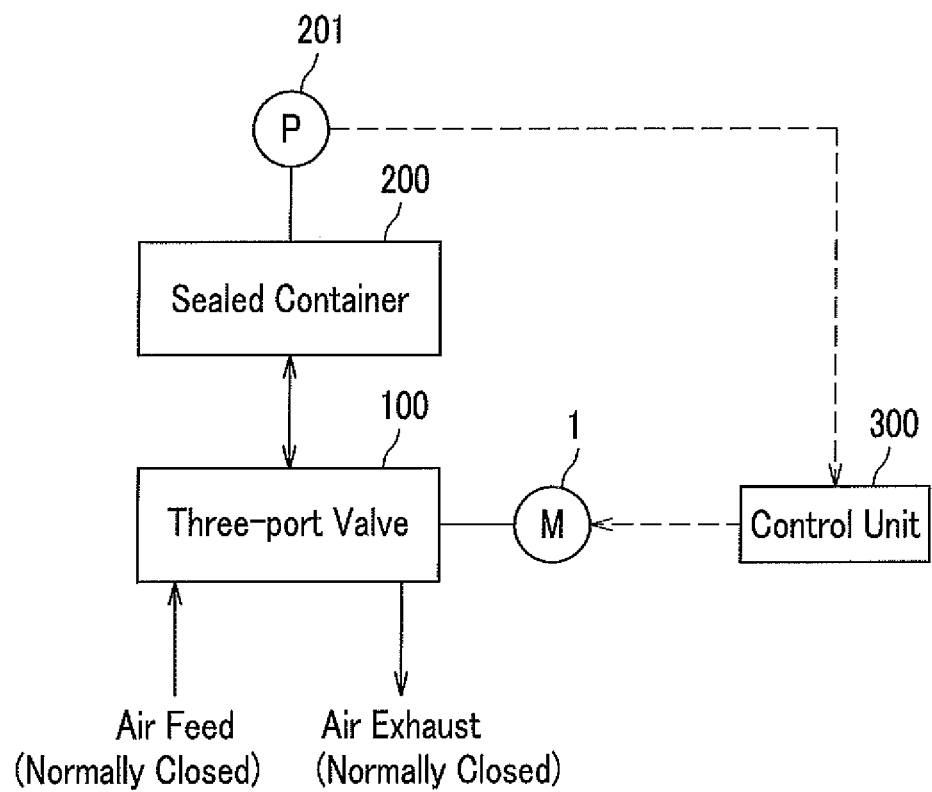
FIG. 6 is a block diagram illustrating an example in which the three-port valve according to the present embodiment is used.

Next, a flow of operations for controlling the pressure of the sealed container is explained with reference to FIGS. 5 and 6. The operations indicated in FIG. 5 are performed in the three-port valve 100 connected to the sealed container 200 as illustrated in FIG. 6. Although the control of the swinging element 9a is performed by the servomotor 1 as explained before, a control unit 300 controls the driving of the servomotor 1 as illustrated. Further, the relationship (represented in a graph, a relational expression, or the like) between the flow rates through the tubes 2a and 2b and the driven amount of the servomotor 1 is determined in advance by experiment or the like.

The control unit 300 includes, for example, a CPU (central processing unit), a ROM (read only memory), a RAM (random access memory), an HDD (hard disk drive), and other elements, and is realized when the CPU executes a predetermined control program stored in the ROM.

After an air supply source (which is, for example, a regulator, a compressor, or the like, and is not shown) is connected to the air feed port 2a1, and the sealed container 200 is connected to the sealed-container connection port 3c, the operations in the flow indicated in FIG. 5 are performed. At this time, the tube 2a (on the air feed side) and the tube 2b (on the air exhaust side) are closed. Initially, the servomotor 1 drives the swinging element 9a to the plus direction (in step S10), so that the flow path through the tube 2a is opened (in step S11), and air feed to the sealed container 200 is started (in step S12). Thereafter, in step S13, the control unit 300 monitors the pressure inside the sealed container 200 with a pressure sensor 201, and feeds the air until the pressure inside the sealed container 200 reaches a predetermined pressure (which is, for example, preset by a user). That is, feedback control is performed during the air feed.

When the control unit 300 detects that the pressure inside the sealed container 200 reaches the predetermined pressure, the control unit 300 returns the driven amount of the swinging element 9a to zero (in step S14), so that the flow path through the tube 2a is closed (in step S15). Therefore, the sealed container 200 comes into a sealed state, so that the pressure is maintained (in a stationary state in step S16).

When an instruction to change the pressure is received from a user in the stationary state (i.e., when Yes is determined in step S20), the control unit 300 determines whether the pressure indicated in the instruction is higher or lower than the current pressure inside the sealed container 200. When it is determined that a pressure raise above the current pressure is needed (i.e., when Yes is determined in step S21), the control unit 300 drives the swinging element 9a to the plus direction (in step S22). Thereafter, the pressure inside the sealed container 200 is raised to the predetermined pressure (in steps S23 to S27) in a similar manner to the aforementioned operations in steps S11 to S27. Thus, the pressure change inside the sealed container 200 is completed.

On the other hand, when it is determined that a pressure fall below the current pressure is needed (i.e., when No is determined in step S21), the control unit 300 drives the swinging element 9a to the minus direction (in step S28), so that the flow path through the tube 2b is opened (in step S29). Since the tube 2b is open to the outside, air exhaust from the sealed container 200 is started (in step S30) when the flow path through the tube 2b is opened. Thereafter, the control unit 300 monitors the pressure inside the sealed container 200 with the pressure sensor 201, and the air is exhausted (in step S31) until the pressure inside the sealed container 200 reaches the predetermined pressure. Thus, the feedback control is performed even during the air exhaust similarly to the feedback control during the air feed.

When the control unit 300 detects that the pressure inside the sealed container 200 reaches the predetermined pressure, the control unit 300 returns the swinging element 9a to zero (in step S32), so that the flow path through the tube 2b is closed (in step S33). Thus, the pressure change inside the sealed container 200 is completed.

Figure 7:
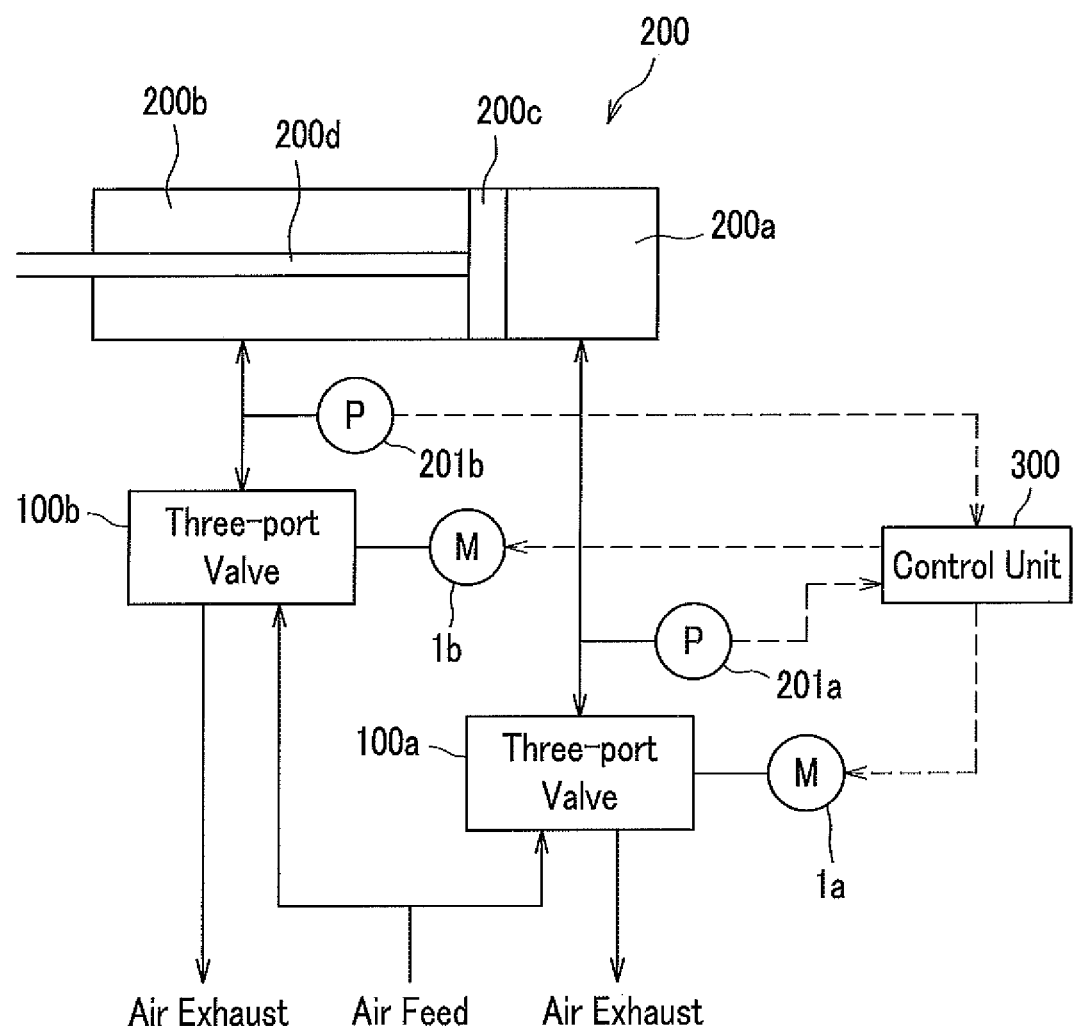
FIG. 7 is a block diagram illustrating another example in which the three-port valve according to the present embodiment is used.

For example, the air cylinder 200 as illustrated in FIG. 7 is suitable for use as the sealed container illustrated in FIG. 6. The air cylinder 200 includes two spaces 200a and 200b which are partitioned with the piston 200c. The piston 200c is connected through a rod 200d to a manipulator (which is, for example, forceps, and is not shown).

The spaces 200a and 200b in the air cylinder 200 are respectively provided with three-port valves 100a and 100b. Specifically, the three-port valve 100a, which is provided with a servomotor 1a, is connected to the space 200a, and the pressure of the space 200a is controlled by the three-port valve 100a. In addition, the three-port valve 100b, which is provided with a servomotor 1b, is connected to the space 200b, and the pressure of the space 200b is controlled by the three-port valve 100b.

Air is fed to the three-port valves 100a and 100b from the same air supply source (not shown). However, the air is independently exhausted from the three-port valves 100a and 100b. When the air cylinder is used as the sealed container 200, the position of the piston 200c can be precisely controlled.

When no external force is imposed on the manipulator connected to the piston 200c, the amount of movement of the piston 200c is determined by the difference between the pressure in the space 200a and the pressure in the space 200b. That is, when the pressure in the space 200a is higher than the pressure in the space 200b, the piston 200c moves so as to reduce the volume of the space 200b. In this case, the piston 200c moves leftward in the illustration. On the other hand, when the pressure in the space 200a is lower than the pressure in the space 200b, the piston 200c moves so as to reduce the volume of the space 200a. In this case, the piston 200c moves rightward in the illustration.

The rod 200d is connected to the space 200b side of the piston 200c. Therefore, the pressure-receiving area of the piston 200c on the space 200a side is not exactly identical to the pressure-receiving area of the piston 200c on the space 200b side. Thus, even when the pressure in the space 200a is equal to the pressure in the space 200b, the motion of the piston 200c does not stop. Consequently, it is preferable to control the driving of the manipulator in consideration of the pressure-receiving areas. However, the difference between the pressure-receiving areas at the piston 200c is very small. Therefore, alternatively, the driving of the manipulator may be controlled without consideration of the difference between the pressure-receiving areas, from the viewpoint of simple control.

As explained above, the piston 200c can be moved by controlling the pressures in the space 200a and 200b. Further, the driving (in the direction of the movement of the piston 200c) of the manipulator connected to the piston 200c can be controlled by the control of the pressures in the space 200a and 200b.

Advantageous Effect

Since the three-port valve 100 has the structure explained before, the three-port valve 100 can be controlled with higher accuracy than the conventional valves. In particular, since the air flowing through the three-port valve 100 does not leak, the three-port valve 100 can be especially satisfactorily controlled.

In addition, in three-port valves 100, the two routes through the tubes 2a and 2b are used, and three ports are arranged. Therefore, feed and exhaust of air can be independently performed, in contrast to the conventional two-port valves. Thus, for example, the flow rate of the air fed to the sealed container can be precisely controlled. In addition, for example, the pressure inside the sealed container can be precisely raised or lowered when the pressure inside the sealed container is controlled.

Since the three-port valves 100 is provided with the single swinging element 9a, the three-port valve 100 can have a downsized and simplified structure. Even the structure is downsized and simplified, the three-port valve 100 can perform precise control.

In addition, when the power supply to the servomotor 1 is stopped in the three-port valve 100, the tubes 2a and 2b are closed (since the tubes 2a and 2b are normally closed). Therefore, the three-port valve 100 can satisfactorily cope with unexpected power failure and the like.

Other Embodiments

In the three-port valve 100 explained above, the pressure is actually measured, and the feedback control is performed. (See steps S13, S25, and S31.) However, for example, the pressure control can be performed, without the feedback control, by adjusting the set screws 10a and 10b explained with reference to FIG. 1.

Figure 8:
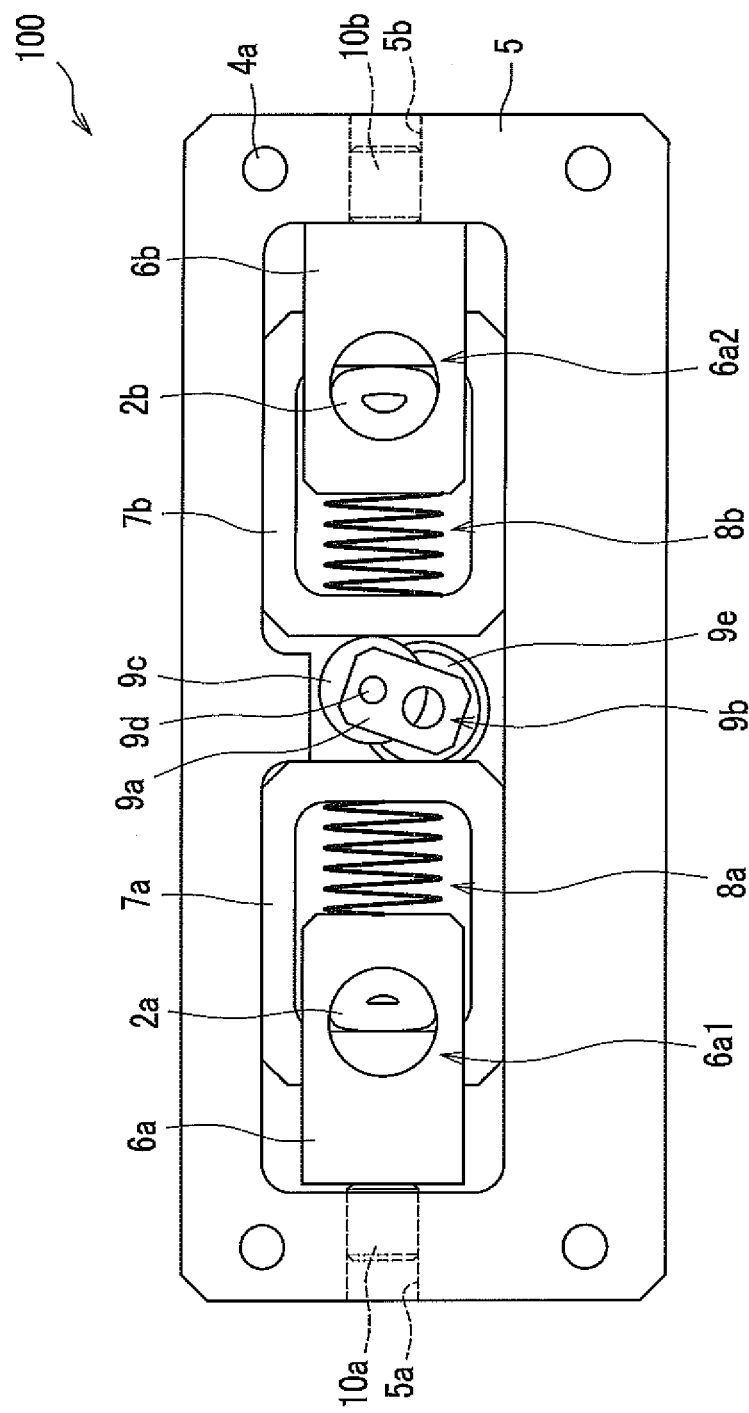
FIG. 8 is an exploded plan view of the three-port valves according to the present embodiment in which a set screw is adjusted to protrude.

FIG. 8 an exploded plan view of the three-port valves according to the present embodiment in which the set screw 10a (which is the screw in contact with the stationary element 6a) is adjusted to protrude into the casing 5. As illustrated in FIG. 8, the position of the stationary element 6a when the set screw 10a protrudes is slightly shifted to the swinging element 9a side, compared with the position of the stationary element 6a when the set screw 10a does not protrude. Therefore, the tube 2a is restored from the deformation which brings the tube 2a into the normally closed state when the set screw 10a does not protrude, so that the tube 2a is brought into the normally open state as illustrated in FIG. 8.

Figure 9:
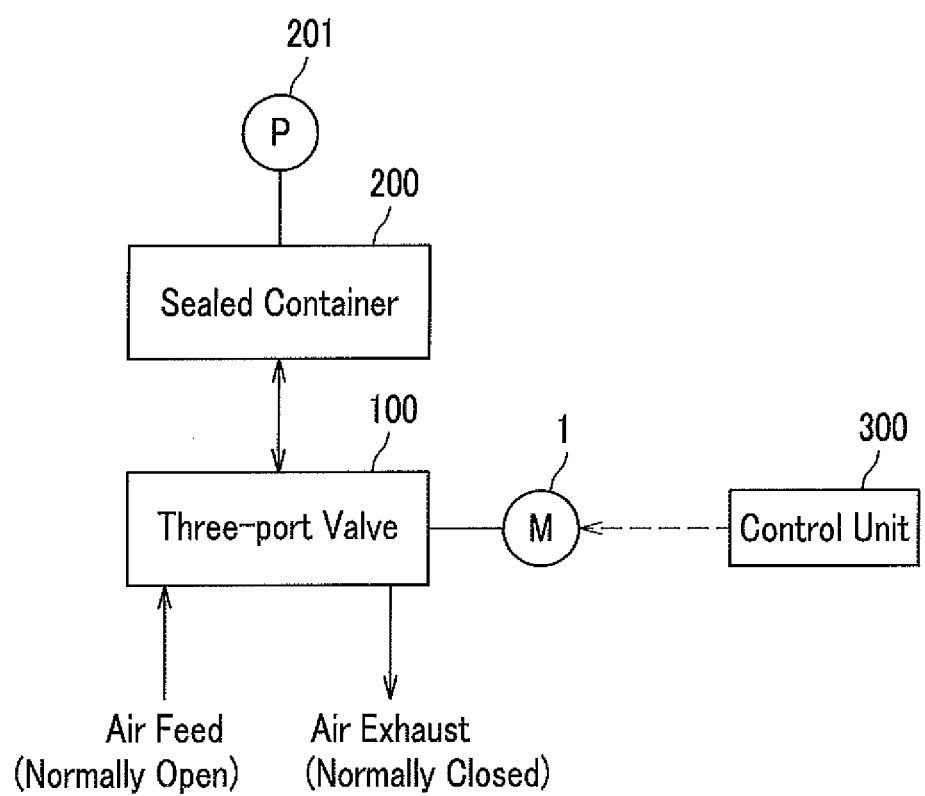
FIG. 9 is a block diagram illustrating further example in which the three-port valve according to the present embodiment is used.

In the case where the three-port valve 100 as above is connected to the sealed container 200 as illustrated in FIG. 9, the pressure inside the sealed container 200 can be controlled without feedback control. That is, in the sealed container 200 illustrated in FIG. 9, the air from the air supply source (not shown) is fed to the sealed container 200 through the normally open tube 2a at all times. However, even in this case, the tube 2b is normally closed.

In the above condition, the pressure inside the sealed container 200 can be calculated by the control unit 300 as explained below. Strictly speaking, the sum of the volume of the sealed container 200 and the volumes of the sections between the sealed container 200 and the closed portions of the tubes 2a and 2b should be considered as the volume V in the calculation. However, normally, the latter volumes are sufficiently smaller than the volume of the sealed container 200. Therefore, normally, sufficient precision can be achieved even when the latter volumes are not considered in the volume V.

The flow rate $G_{in}$ of the air fed to the inside of the three-port valve 100 through the tube 2a, the flow rate $G_{out}$ of the air exhausted from the three-port valve 100 through the tube 2b to the outside, and the flow rate G of the air fed to the sealed container 200 satisfy the following equation (1).

$$G_{in}=G+G_{out} \tag{1}$$

Further, the pressure P inside the sealed container 200, the inner volume (capacity) V of the sealed container 200, the quantity n of the air in the sealed container 200, the gas constant R, and the temperature T satisfy the following equation (2).

$$P=nRT/V \tag{2}$$

Since the tube 2a on the air feed side is open and the tube 2b on the air exhaust side is closed in the stationary state, the pressure P inside the sealed container 200 is equal to the pressure $P_s$ of the air fed to the sealed container 200. That is, the pressure P inside the sealed container 200 in the stationary state is $P_s$.

On the assumption that the temperature T of the air fed to the sealed container 200 and the capacity V of the sealed container 200 are not changed, the differentiation of the equation (2) with respect to the time t gives the following equation (3).

$$dP/dt=P'=GRT/V \tag{3}$$

When the set screw 10a is adjusted to protrude into the casing 5, the tube 2a on the air feed side are normally open as mentioned before. On the other hand, the tube 2b on the air exhaust side is normally closed, i.e., $G_{out}=0$. In addition, when the swinging element 9a is driven to release the tube 2b from the closed state, the air begins to be exhausted through the tube 2b to the outside, i.e., $G_{out}$ begins to increase. At this time, G becomes negative, i.e., G<0, according to the equation (1).

According to the equation (3), P'<0 when G<0. Therefore, the pressure inside the sealed container 200 is lowered from the pressure $P_s$ in the stationary state, so that a pressure difference arises between the pressure $P_s$ of the air fed to the sealed container 200 and the pressure inside the sealed container 200, and $G_{in}$ increases. The amount of increase in $G_{in}$ is determined on the basis of the relationship between the aperture and the pressure in the tube 2b (in accordance with ISO 6358, JIS B 8390, or the like). As $G_{in}$ increases by the determined amount, $G_{out}$ varies to be equalized with $G_{in}$.

When $G_{out}$ becomes equal to $G_{in}$, G=0 and P'=0, and the pressure inside the sealed container 200 is equilibrated at a value, which is uniquely determined on the basis of the aperture of the tube 2b or the displacement of the swinging element 9a which gives the value of $G_{out}$ and $G_{in}$. As a result of a study made by the present inventors, the above control system can be considered to be a first-order lag system. The pressure inside the sealed container 200 can be controlled by the position control of the swinging element 9a as above.

In addition, when the control is performed as above, feedback control is unnecessary for the pressure control. Therefore, the burden of calculation imposed on the control unit can be reduced, and the calculation by the control unit becomes easy.

Although the tube 2a is set to be normally open in the above explanations, the three-port valve 100 can be similarly controlled even in the case where the tube 2b is set by the set screw 10b to be normally open.

Specifically, in the case where the set screw 10b is adjusted to protrude into the casing 5, the tube 2b on the air exhaust side becomes normally open. On the other hand, the tube 2a on the air feed side becomes normally closed ((i.e., =0). In this condition, when the swinging element 9a is driven to release the tube 2a from the closed state, air from the outside begins to be fed through the tube 2a, i.e., $G_{in}$ begins to increase. At this time, G becomes positive, i.e., G>0, according to the equation (1).

According to the equation (3), P'>0 when G>0. Therefore, the pressure inside the sealed container 200 rises from the pressure $P_s$ in the stationary state, so that the pressure difference between the atmospheric pressure on the air exhaust side and the pressure inside the sealed container 200 increases, and $G_{out}$ increases. The amount of increase in $G_{out}$ is determined on the basis of the relationship between the aperture and the pressure in the tube 2a (in accordance with ISO 6358, JIS B 8390, or the like). As $G_{out}$ increases by the determined amount, $G_{in}$ varies to be equalized with $G_{out}$. Thereafter, the pressure inside the sealed container 200 can be controlled in a similar manner to the aforementioned case.

In addition, it is possible to appropriately determine, on the basis of conditions for the pressure control, which of the tube 2a on the air feed side and the tube 2b on the air exhaust side is to be set normally open.

<Variations>

Although an embodiment of the present invention is explained above, the present invention is not limited to the explained embodiment, and can be arbitrarily modified and implemented without departing from the gist of the present invention.

For example, the gas for which the three-port valve 100 can be used is not limited to air, and the three-port valve 100 can be used for arbitrary gas. Further, the fluid for which the three-port valve 100 can be used is not limited to gas, and the three-port valve 100 can be used for arbitrary fluid. The sealability is particularly required in the valves which control the flow of liquid, compared with the valves which control the flow of gas. Therefore, the three-port valve according to the explained embodiment, in which no leakage occurs, is suitable as a valve for controlling the flow of liquid.

In addition, although, in the three-port valve 100, an end of the tube 2a is the air feed port and an end of the tube 2b is the air exhaust port, the assignment of the air feed port and the air exhaust port may be exchanged. That is, an end of the tube 2a may be the air exhaust port, and an end of the tube 2b may be the air feed port.

Further, the first flow control means (constituted by the stationary element 6a, the movable element 7a, and the compression spring 8a), the second flow control means (constituted by the stationary element 6b, the movable element 7b, and compression spring 8b), and the swinging element 9c, which are arranged for controlling the flow of gas through the tubes 2a and 2b, are not limited to the illustrated examples. For example, the swinging element 9c may be formed in a cylindrical shape, and the end faces of the swinging element 9c may be brought into contact with the movable element 7a or 7b to move the movable element 7a or 7b.

Further, it is possible to dispense with the stationary element 6a and the movable element 7a, and make the tubes 2a and 2b normally closed, by use of the compressing springs 8a and 8b and a control member (not shown) or the like connected to the compressing springs 8a and 8b. Specifically, the tubes 2a and 2b can be made normally closed by pressing the tubes 2a and 2b with the control member, and the flows through the tubes 2a and 2b can be controlled by moving the control member with the swinging element 9a so as to release the tube 2a or 2b from the normally closed state.

In the example of FIG. 8, the stationary elements 6a and 6b can be moved with the set screws 10a and 10b. Alternatively, for example, in the case where the compressing springs 8a and 8b are not used, it is possible to move the movable elements 7a and 7b.

In the flow of operations explained with reference to FIG. 5, the tubes 2a and 2b are simply opened and closed. Further, it is possible to configure the three-port valve 100 to control the apertures of the tubes 2a and 2b, for example, according to the pressure inside the sealed container 200. For example, in some cases, the air feed rate to the sealed container 200 can be different from the air exhaust rate from the sealed container 200 according to the pressure difference between the pressure inside the sealed container 200 and the external pressure. Therefore, for example, when the air feed rate is high, it is possible to moderate the air feed rate by reducing the aperture of the tube 2a from the viewpoint of stable control. On the other hand, when the air feed rate is low, it is possible to increase the air feed rate by increasing the aperture of the tube 2a from the viewpoint of quick air feed. Thus, the rates of air feed and air exhaust can be controlled by controlling the aperture as above.

Further, although the tube 2a is set to be normally open in FIG. 8, instead the tube 2b may be set to be normally open. Alternatively, both of the tubes 2a and 2b may be set to be normally open. When the balance between the air feed rate and the air exhaust rate is required to be changed, it is possible to adjust the apertures of the tubes 2a and 2b as needed. As mentioned before, the air feed rate and the air exhaust rate may be different in some instances. For example, in the case where the pressure of the air fed from an air supply source is 0.5 MPa and the external pressure is 0.1 MPa (the atmospheric pressure), the pressure inside the sealed container may be controlled around 0.4 MPa.

In the above case, the pressure inside the sealed container is near the pressure of the air fed from the air supply source. Since the pressure difference between the pressure inside the sealed container and the external pressure is greater than the pressure difference between the pressure inside the sealed container and the pressure of the air fed from the air supply source, the air exhaust rate can become faster than the air feed rate. Therefore, in such a case, it is possible to adjust the set screw 10a to protrude and make the tube 2a normally open.

In addition, although the tubes 2a and 2b in the illustrated example extend in the direction perpendicular to the plane of the illustration, the tubes 2a and 2b may be arranged to extend in directions parallel to the plane of the illustration, and each means for controlling the flow rate may be arranged accordingly.

LIST OF REFERENCES

2a: Tube (First Elastic Tube)
2a1: Air Feed Port (Feed Port, Port For Feed And Exhaust, First Port)
2b: Tube (Second Elastic Tube)
2b1: Air Exhaust Port (Exhaust Port, Port For Feed And Exhaust, Second Port)
3c: Sealed-container Connection Port (Port For Feed And Exhaust, Third Port)
7a: Movable Element (First Flow Control Means)
7b: Movable Element (Second Flow Control Means)
8a: Compression Spring (First Flow Control Means)
8b: Compression Spring (Second Flow Control Means)

9a: Stationary Element (First Flow Control Means)
9b: Stationary Element (Second Flow Control Means)
9c: Swinging Element
100: Three-port Valve
200: Sealed Container (Controlled Object)

The invention claimed is:

1. A three-port valve comprising:

a first elastic tube through which fluid flows;

a first port arranged as a port for feed and exhaust in the first elastic tube;

a second elastic tube through which the fluid flows;

a second port arranged as a port for feed and exhaust in the second elastic tube;

a third port which communicates with the first port and the second port;

a first flow control means including a first elastic member and a first movable element through which the first elastic tube is arranged, and controlling flow of the fluid through the first elastic tube by moving the first movable element outward in a direction of elasticity of the first elastic member so as to deform the first elastic tube;

a second flow control means including a second elastic member and a second movable element through which the second elastic tube penetrates, and controlling flow of the fluid through the second elastic tube by moving the second movable element outward in a direction of elasticity of the second elastic member so as to deform the second elastic tube;

a swinging element which drives the first flow control means and the second flow control means;

a first adjustment member which adjusts a flow rate by being moved toward the swinging element in the direction of elasticity of the first elastic member against elastic force of the first elastic member so as to deform the first elastic tube arranged through the first movable element, independently of driving of the swinging element; and a second adjustment member which adjusts a flow rate by being moved toward the swinging element in the direction of elasticity of the second elastic member against elastic force of the second elastic member so as to deform the second elastic tube arranged through the second movable element, independently of the driving of the swinging element;

wherein a set of the first elastic tube and the first flow control means and a set of the second elastic tube and the second flow control means are symmetrically arranged with respect to the swinging element.

2. The three-port valve according to claim 1, wherein the swinging element is rotatably arranged, and rotates so as to drive the first flow control means and the second flow control means.

3. The three-port valve according to claim 1, wherein the first elastic tube and the second elastic tube are normally closed.

4. The three-port valve according to claim 1, wherein the first port is a feed port, the second port is an exhaust port, and the third port is a port for feed and exhaust which is connected to an object to be controlled.

* * * * *